United States Patent [19]
Cerda et al.

[11] Patent Number: 5,738,526
[45] Date of Patent: Apr. 14, 1998

[54] EDUCATIONAL TOY DOLL WITH LCD DIGITAL DISPLAY WATCH

[76] Inventors: Juan J. Cerda, 15205 S.W. 77 CT., Miami, Fla. 33157; Jose Berenguer, Ctra. de Alicante, 8, 03430 Onil, Spain

[21] Appl. No.: 692,282

[22] Filed: Aug. 5, 1996

Related U.S. Application Data

[63] Continuation-in-part of Ser. No. 493,859, Jun. 22, 1995, abandoned.

[51] Int. Cl.⁶ .............................. G09B 19/12; A63H 3/28
[52] U.S. Cl. ................................ 434/304; 446/297
[58] Field of Search .............................. 446/297–303; 434/304, 309, 308

[56] References Cited

U.S. PATENT DOCUMENTS 3,636,655  1/1972  Porter et al. ........................... 446/302
4,654,659  3/1987  Kubo ..................................... 446/299 X
4,802,879  2/1989  Rissman et al. ........................ 446/175

*Primary Examiner*—Mickey Yu
*Attorney, Agent, or Firm*—John K. Donaghy

[57] ABSTRACT

A toy doll for teaching time of day and time relationships for daily activities, including a hollow body housing a speaker and an associated memory, the memory including controls for storage of selected words for announcement by the speaker, a display unit attached to the exterior of the toy doll including individually selectable display figures, and operator control buttons attached to the exterior of the doll for activating the speaker and the display unit. Means are also included for activation of a time of day display and announcement on demand, and for activation of preset alarms and announcements on demand for review purposes and for education of the intended user.

4 Claims, 4 Drawing Sheets

5,738,526

1

EDUCATIONAL TOY DOLL WITH LCD DIGITAL DISPLAY WATCH

CONTINUING APPLICATION DATA

This application is a continuation-in-part of our application Ser. No. 08/493,859, filed Jun. 22, 1995, and now abandoned.

BACKGROUND OF THE INVENTION

1. Field of the Invention

This invention pertains to toy dolls and particularly to toy dolls with LCD watch features and pressure pads to activate time and other graphical features.

2. Background of the Prior Art

The prior art discloses toy dolls with simulated watch features, noise features and sound recording features, and tape playing features.

Representative of the prior art patents are U.S. Pat. Nos. 3,636,655 (simulated watch); 5,279,514 (record a message); 5,281,180 (cries and laughs); and 4,642,710 (tape player).

SUMMARY OF THE INVENTION

There is a need for an educational toy doll which teaches children such things as time of day, time to go to bed, time to get up and time for meals.

It is therefore one object of this invention to provide a toy doll with a watch display and watch operation and alarm operation.

It is another object of this invention to provide a toy doll with electronic circuitry and operators associated with a wrist watch whereby a child may press the operator and see the time on the watch.

Another object of this invention is to provide a toy doll with additional watch operators, the activation of which gives a different time read-out on the wrist watch.

Another object of this invention is to provide a toy doll with a wrist watch connected to internal circuitry and associated operators at various locations on the doll's body. The operators may be selectively activated by a child to display five time of day read-outs and graphical symbols such as eating cutlery, a moon and sun face, as well as audible messages related to said graphical symbols.

Yet another object of the invention is to provide a doll provided with an LCD digital watch display on its arm, a prominent "SPEAK" button positioned on its hand that tells the time and 3 other child-proof time and alarm setting buttons. There are 4 alarms that can be set to 4 different times and linked to 4 graphical symbols on the LCD display.

These and other objects of this invention will be described in the following specification when taken with the annexed drawings.

2

DESCRIPTION OF THE PREFERRED EMBODIMENT OF THE INVENTION

Figures 1, 2:
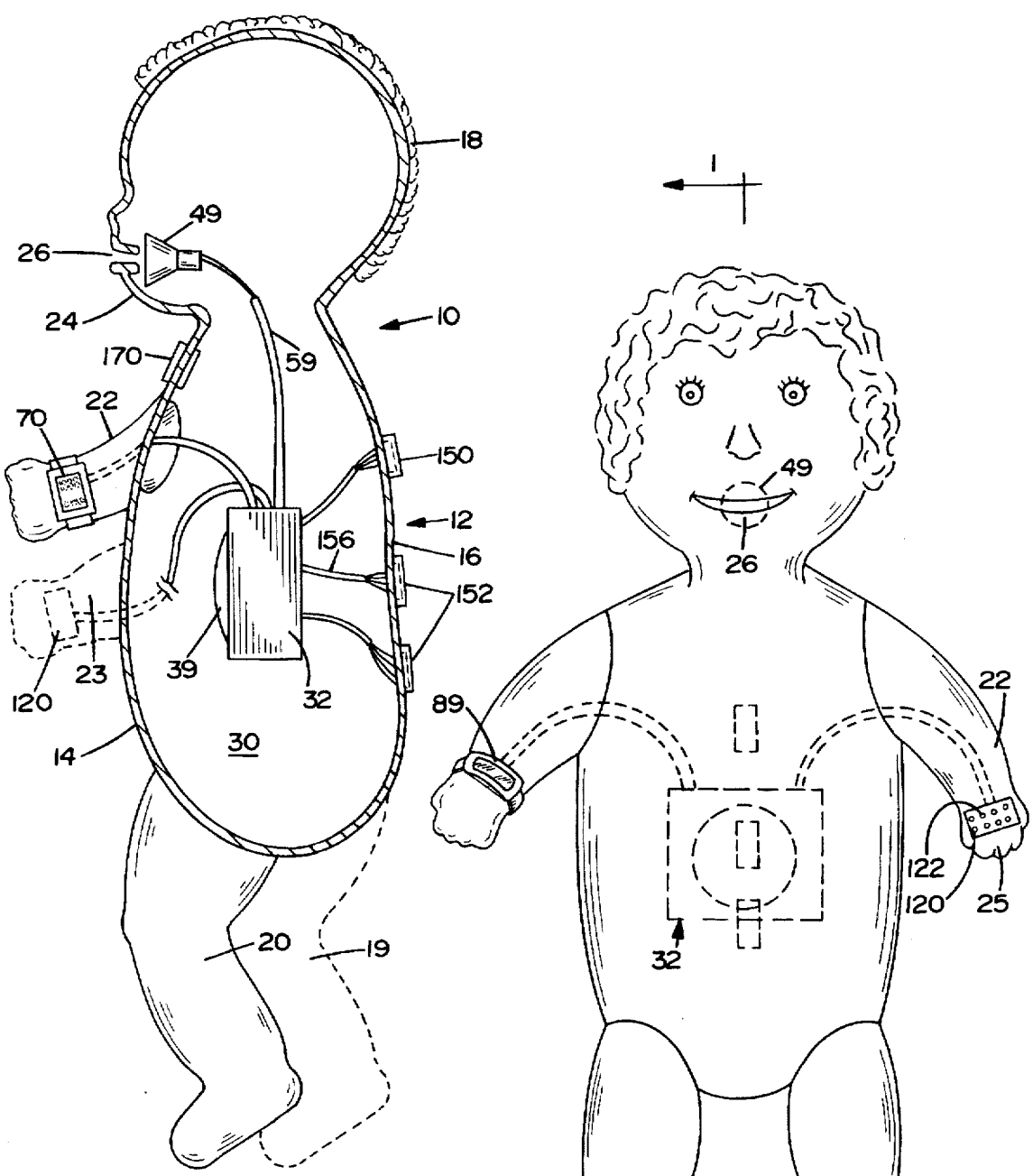
FIG. 1 is a sectional side view of said doll showing interior housing and wiring.
FIG. 2 is a front view of said doll.

Referring now in more detail to the drawings, FIG. 1 shows a doll 10 having a body portion 12 with front 14 and back 16, head portion 18, legs 19 and 20 and arms 22. The face 24 has a mouth opening 26.

Figure 3:
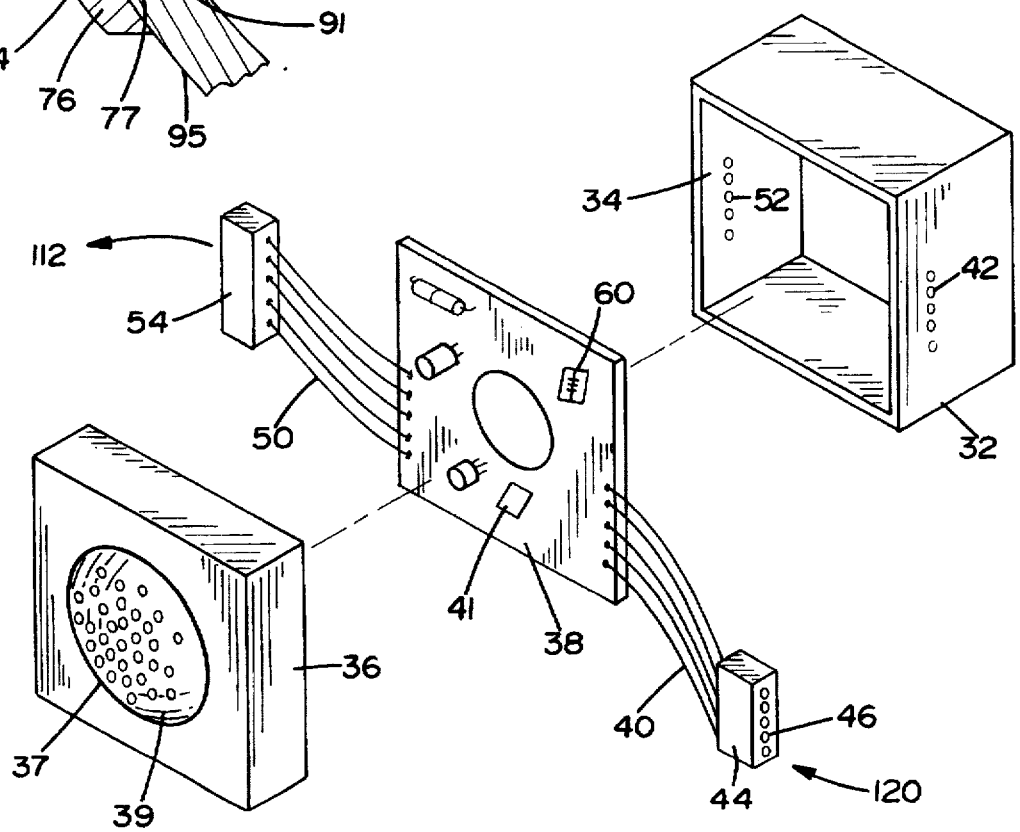
FIG. 3 is an exploded view of said housing, PCB, wiring and connectors.

Referring to FIG. 3, the doll cavity 30 supports a housing 32 which contains a speaker 39, and a printed circuit board PCB 38. The housing or case 32 has a hollow bottom 34 and a top box portion 36. PCB 38 contains an electronic memory 41, control circuitry, and power supply 60. Extending from the circuit board 38 are a set of wires 40 which are routed through holes 42 in case 32 for carrying signals from operator control buttons 122 to PCB 38. The ends of the wire set 40 have a connector 44 with female receptors 46.

Figure 5:
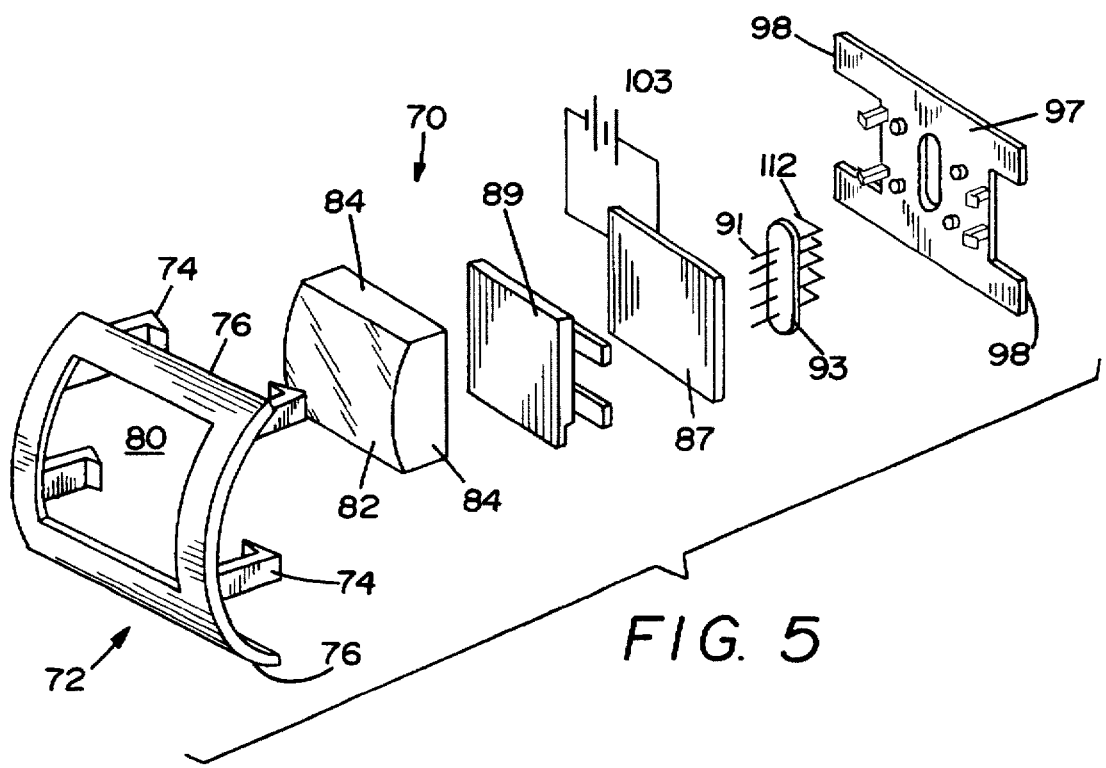
FIG. 5 is an exploded view of the components of the watch device of FIG. 4.

Extending from circuit board 38 is a second set of wires 50 which are routed through holes 52 in the case 32 for carrying signals from PCB 38 to display device 70 via pins 112 in FIG. 5. The ends of the wire group 50 have a connector 54 with female receptors (not shown) similar to the female receptors 46.

The box or case top 36 has an opening 37 in which there is secured a speaker 39. The speaker 39 is connected directly to contacts on the PCB 38. A battery 60 supplies power to the PCB 38, memory 41 and the related speaker control circuitry thereon.

Figure 4:
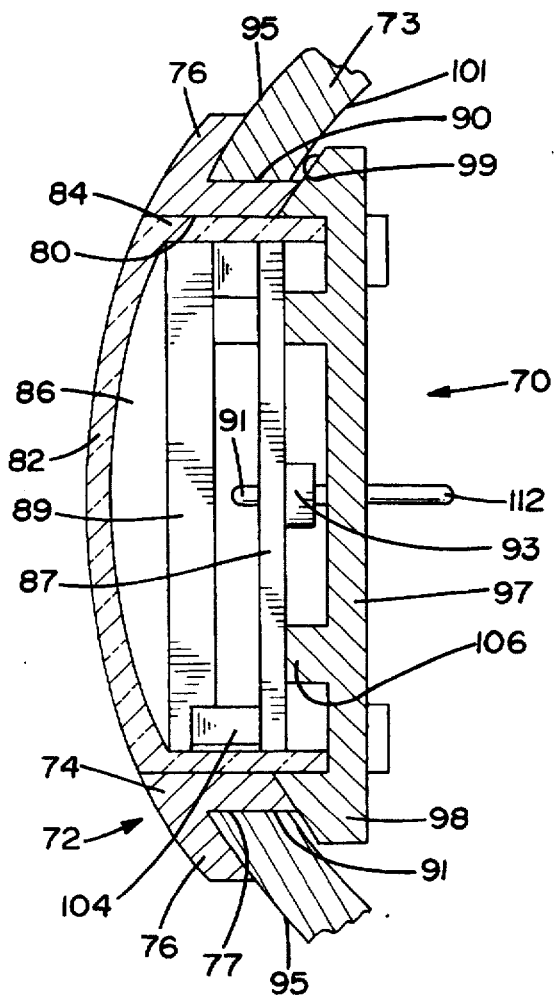
FIG. 4 is a sectional side view of the watch device with LED, PCB, etc.
Figure 7:
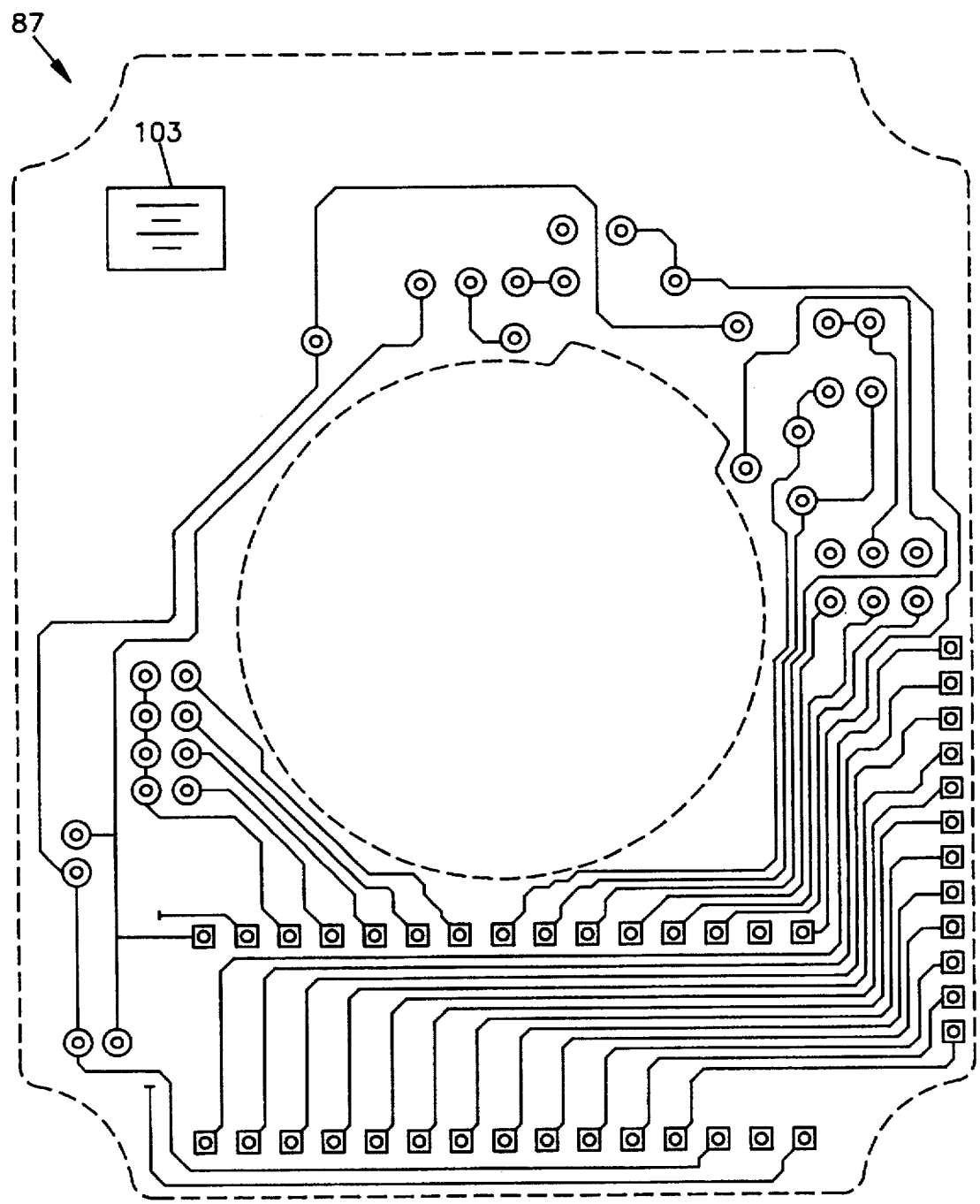
FIG. 7 is a plan view of the PCB layout.

One of the doll arms 22 supports a display device 70, shown in FIGS. 1 and 2. Referring to FIGS. 4, 5 and 7, the display 70 has an outer frame 72 including a plurality of prongs 74 extending away from the frame 72. Opposing lips 76 extend away from the prongs 74. The prongs 74 and lips 76 define a triangular slot 77 which functions to seat in an aperture 90 in the arm body 73, the aperture 90 being defined by circumferentially extending wall 91 formed in arm body 73. The frame 72 has an opening 80 which receives a clear dome face member 83 having walls 84 positioned tightly inside and held by prongs 74. The dome 82 and walls 84 define a chamber 86 for housing electronics including a printed circuit board PCB 87, power supply 103, LED unit 89, wiring 91 and header 93 with connectors 112 as shown.

The slot 77 defined by prongs 74 and lips 76 on the frame 72 is supported on wall 91 and surface 95 on the doll arm body 73 in such manner that the prongs 74 and lips 76 tightly hold the frame 72 in the arm body 73. The lips 76 of the frame 72 overlie the surface 95 of arm body 73 as shown.

It will be appreciated and it is contemplated that the display may be secured to any point on the doll, FIG. 1. For example, the display 170 may be attached to the chest of the doll by providing an aperture whereby the display 170 may be inserted and secured. The electrical lines would merely be rerouted.

A back cover 97 has tabs 98 having slanted walls 99 in abutment with the inner surface 101 of the doll arm 73. The tabs 98 and lips 76 lock the frame to the doll arm as shown.

Zebra connectors 104 join the LED unit 89 and PCB 87 to each other. Spacers 106 separate the PCB 87 from the cover 97.

Referring to FIGS. 5 and 7, the PCB 87 contains LED unit control circuit and connectors and power supply 103. The connector 93 has a series of groups of pins 112 which mate to the connector 54 of PCB 38 inside housing 32.

Figure 6:
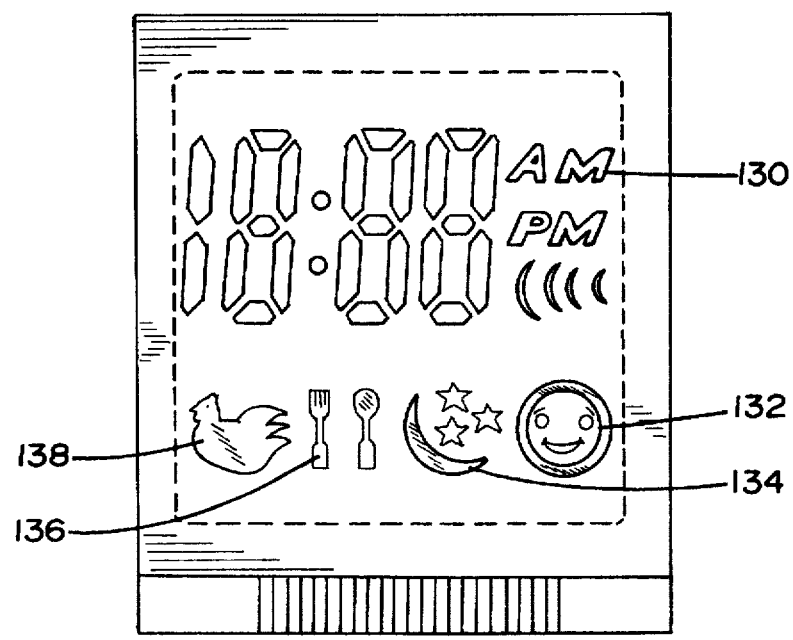
FIG. 6 is a front view of the LCD display device showing various symbols.

The LED unit 89, of FIGS. 5 and 6, has numerous display symbols thereon such as time functions 130, sunrise 132, moon 134, cutlery 136, and bird 138. These symbols correspond to the time of day: sunrise for getting up; moon for going to bed; utensils for eating food; etc. These display functions respond to a pressure control pad operator 120 located on the hand 25 of the arm 22, FIGS. 1 and 2. The control pad 120 is connected to the PCB 87 circuitry through connectors 46, 54 and pins 112.

A doll provided with an LCD digital watch display on its arm, a prominent "SPEAK" button positioned on its hand that tells the time and three other child-proof time and alarm setting buttons. There are four alarms that can be set to four different times and linked to four graphical symbols on the LCD display.

| Vocabulary: | | |
|---|---|---|
| It's | ten | thirty |
| The time is | eleven | forty |
| one | twelve | fifty |
| two | thirteen | oh (as in two-oh-five) |
| three | fourteen | Good |
| four | fifteen | Morning |
| five | sixteen | Evening |
| six | seventeen | Afternoon |
| seven | eighteen | Wake up sleepy head |
| eight | nineteen | I'm hungry. Let's eat. |
| nine | twenty | Good Night. See you in the morning. Let's have fun. |

Referring to FIG. 3, these time functions operated by the button 122 (switch A) also activate audible announcements by the speaker 39 which correspond to the LED function displayed. The audible announcements are stored in memory 41 on PCB 38 along with control electronics initiating the announcements when activated by a particular operator button 122. The display PCB 87 is connected to control pad 120, switch 150, switch 152, switch 154, and connectors 54 and 44; connectors 54 and 44 are in turn connected to PCB 38 inside housing 32. When the time of day is shown on the LED 87, the speaker 39 is operated under control of memory 41 and announces the time so as to be heard by the child. The moon function is announced as time to go to bed; the sunrise function is announced as time to get up; and the utensils functions is announced as time to eat, etc.

The child merely presses the pressure pad control button (switch A) 122 and hears the features announced on the speaker 39.

Additional control pads 150 (B), 152 (C), and 154 (D) may be placed on the back 16 of the doll. These controls are connected by wire 156 to the connector 44 of PCB 38 in the same manner as control pad 120.

The following is a summary of the switch functions of switches A, B, C and D.

| Switch A | Switch B | Switch C | Switch D |
|---|---|---|---|
| Time | Set Hour | Set Time | Set minutes |
| Alarm on-off | | Set Alarm | Play alarm |

(i) Switch A:
  Time Announcement. Use format: 'Good xxxx. The time is . . . '
(ii) Switch C:
  Activates after 2 seconds of continuous pressing.
  a) Time Setting Mode: No alarm symbols are displayed. The ((((( symbol is not displayed. The current hour and minute blinks. Switch B increments the hours—each hour is announced. AM or PM is automatically displayed. Switch D increments the minutes—each minute is announced. Switch A allows the user to return to Normal mode. Switch C goes to the Alarm 1 Setting mode.
  b) Alarm 1 Setting Mode: The Alarm 1 symbol alone is displayed. The hour and minute of Alarm 1 (Previous setting/Default setting) blinks. Switch B increments the hours, AM or PM is also displayed. Switch D increments the minutes. Both hour and minute increments are announced. Switch A toggles the alarm ON/OFF (((( symbol. Switch C goes to the Alarm 2 Setting mode.
(iii) Switch D: Plays alarms sequentially. If the alarm is ON:
  Alarm symbol blinks. The (((( symbol is on. Alarm time is displayed. Alarm time is announced. Alarm message is played.
If the alarm is OFF:
  Alarm symbol blinks. The (((( symbol is off. Normal time is displayed. Normal time is announced. Alarm message is played.
  Normal display mode is activated immediately after this. The next press of Switch D will select the next alarm symbol and play the corresponding message.
(iv) Normal operation:
  All alarm symbols are displayed. The (((( symbol is not displayed.
(v) Alarm Triggering:
  The alarm message format is: Good xxxx. It's . . . Alarm Message. The corresponding alarm symbol blinks. The (((( symbol is displayed. The message is repeated 5 times with an interval of 1 minute between each repetition. Switch A can disarm the alarm. The alarm symbol stops blinking and the (((( symbol is cleared.

These switches are designed to enhance the educational qualities of the doll, allowing the parents to set the doll's alarms to times which correspond to the child's daily activities. Thus, the parents may set the various alarms to their own child's wakeup time, meal time and bed time as a reminder for the child of his or her daily schedule.

To further facilitate interaction between parent and child, the alarm messages may be played at any time by activation through switch D without waiting for the normal alarm cycle, and thus the alarms may be reviewed with the child prior to their activation to help the child understand what is expected of him or her. Also, switch A, when activated, causes the doll to announce the actual time preceded by the time of day, such as "Good morning, the time is nine o'clock.", which can be used to teach the child time-of-day and actual time relationships.

All alarms are settable by the parent for whatever time they may choose, allowing the doll to be programmed specifically for each individual situation. This allows for such changes as school day schedules, weekend schedules, etc. Once the alarms are set, they will automatically sound at the preset time until they are changed or deactivated.

A speaker 49, FIG. 1, may be secured inside the doll's head 18 adjacent the opening 26 and connected via electric lines 59 to the PCB 38 inside the housing 32 in lieu of speaker 39. This would give a more intense audible sound emanating from the mouth opening 26 and be more realistic to the child.

While the invention has been described with regard to a preferred embodiment thereof, it will be appreciated by those skilled in the art of which the invention pertains that numerous changes may be made in the invention to enhance its usefulness without departing from the spirit and scope thereof as set forth in the appended claims.

What we claim is:

1. A toy doll for teaching time of day and time relationships for daily activities comprising:

a hollow body housing a speaker and an associated memory including controls for storage of selected words for announcement by said speaker;

a display unit attached to the exterior of said toy doll including individually selectable display figures;

operator control buttons attached to the exterior of said doll for activating said speaker and said display unit;

means for activating, on demand, a combination of a time of day display and an announcement of daily activities corresponding to the time of day to be displayed the particular combination of display and announcement being preselected by operator;

and means for activating display and announcement of preset alarms on demand for review purposes and for education of the intended user.

2. A toy doll for teaching time of day and time relationships for daily activities comprising:

a doll having a hollow body, head, arms and legs;

electronic means in the hollow body;

display means on said doll;

connections between said display means and said electronic means;

control means to operate said electronic means and said display means whereby time functions appear on said display means;

means for activating, on demand, a combination of a time of day display and an announcement of daily activities corresponding to the time of day to be displayed, the particular combination of display and announcement being preselected by operator;

and means for activating display and announcement of preset alarms on demand for review purposes and for education of the intended user.

3. A toy doll for teaching time of day and time relationships for daily activities comprising:

at least one arm having a circumferentially extending wall defining an opening;

a housing having display means circumscribed by walls thereabout;

said walls situated within said opening and abutting said circumferentially extending walls;

control means to operate the display means whereby time functions appear on the display;

means for activating a time of day display and announcement on demand;

and means for activating display and announcement of preset alarms on demand for review purposes and for education of the intended user.

4. A toy doll for teaching time of day and time relationships for daily activities according to claim 3, wherein:

said circumferentially extending walls defining said opening are situated in a wrist of said arm and said display means is located within said opening and attached to said circumferentially extending walls.

* * * * *